United States Patent [19]
Dawson et al.

[11] Patent Number: 5,226,109
[45] Date of Patent: Jul. 6, 1993

[54] THREE DIMENSIONAL COMPUTER GRAPHIC SYMBOL GENERATOR

[75] Inventors: John F. Dawson; Douglas E. Thorpe, both of Albuquerque, N. Mex.

[73] Assignee: Honeywell Inc., Minneapolis, Minn.

[21] Appl. No.: 514,742

[22] Filed: Apr. 26, 1990

[51] Int. Cl.$^5$ .............................................. G06F 15/72
[52] U.S. Cl. .................................... 395/120; 395/141; 395/159
[58] Field of Search ............... 395/120, 134, 141, 164, 395/166, 159; 340/799

[56] References Cited

U.S. PATENT DOCUMENTS

| | | | |
|---|---|---|---|
| 4,862,392 | 8/1989 | Steiner | 395/164 X |
| 4,888,712 | 12/1989 | Barkans et al. | 395/134 |
| 4,967,375 | 10/1990 | Pelham et al. | 395/166 |
| 5,016,192 | 5/1991 | Ishido et al. | 395/166 |

*Primary Examiner*—Mark K. Zimmerman
*Attorney, Agent, or Firm*—Ronald E. Champion

[57] ABSTRACT

An apparatus for generating three dimensional graphic symbols. Each symbol includes a plurality of polygons referenced to a datum point in a cartesian coordinate system, for example, having X, Y and Z axes. Apparatus for storing a vertex list is included. The vertex list characterizes each symbol and includes a starting address and a plurality of vertices, wherein each vertex is comprised of X, Y, and Z offsets from the datum point. In one embodiment, each vertex has a surface normal assigned to it. Connected to the vertex storing apparatus is an apparatus for registering an icon ID reference numeral to each symbol. An apparatus for mapping to the starting address is further connected to an output of the registering apparatus. The mapping apparatus uses the icon ID reference numeral to point to each symbol's starting address. Apparatus for transforming the vertex list into a different coordinate system is arranged to receive the vertex list from the vertex storing apparatus. Apparatus for tiling each symbol is arranged to receive the transformed vertex list from the transforming apparatus and tiles the symbol in accordance with a connectivity map.

6 Claims, 10 Drawing Sheets

| | 15 | 14 | 13 | | 0 | |
|---|---|---|---|---|---|---|
| | | | | | | ICON START |
| AA | | | −3 (X) | | | ⎫ VERTEX A |
| BB | | | ∅ (Y) | | | |
| CC | EOV ∅ | | +3 (Z) | | | ⎭ |
| DD | EOSN ∅ | X ∅ | Y −1 | | Z ∅ | ⎫ S/N FOR POLYGON ABCD |
| EE | | | ∅ | | | ⎫ VERTEX B |
| FF | | | ∅ | | | |
| GG | EOV ∅ | | +3 | | | ⎭ |
| HH | EOSN ∅ | 1 | ∅ | | ∅ | ⎬ S/N FOR POLYGON BHED |
| | | | −3 | | | ⎫ VERTEX C |
| | | | ∅ | | | |
| | ∅ | | ∅ | | | ⎭ |
| | ∅ | ∅ | 1 | | ∅ | ⎬ S/N FOR POLYGON EHGF |
| | | | ∅ | | | ⎫ VERTEX D |
| | | | ∅ | | | |
| | ∅ | | ∅ | | | ⎭ |
| | ∅ | −1 | ∅ | | ∅ | ⎬ S/N FOR POLYGON AGFC |
| | | | ∅ | | | ⎫ VERTEX E |
| | | | 3 | | | |
| | ∅ | | ∅ | | | ⎭ |
| | 1 | ∅ | ∅ | | +1 | ⎬ S/N FOR POLYGON ABHG ✱ |
| | | | −3 | | | ⎫ VERTEX F |
| | | | +3 | | | |
| | ∅ | | ∅ | | | ⎭ |
| | | | −3 | | | ⎫ VERTEX G |
| | | | +3 | | | |
| | ∅ | | +3 | | | ⎭ |
| | | | ∅ | | | ⎫ VERTEX H |
| | | | +3 | | | |
| | 1 | | +3 | | | ⎭ |

→ ZZ END OF ICON AND VERTICE SET TO 1

✱(NOTE, END OF S/N BIT SET)

RGB RAM 116

| ADDRESS | DATA |
|---------|------|
| 0 | $RGB_1$ |
| 1 | $RGB_2$ |
| 2 | $RGB_3$ |
| 3 | $RGB_4$ |
| 4 | $RGB_5$ |
| 5 | X |
| 6 | X |
| 7 | X |
| 8 | X |
| 9 | X |
| 10 | X |
| 11 | X |
| 12 | X |
| 13 | X |
| 14 | X |
| 15 | X |

Fig.-10

X', Y', Z' RAM — 118

| ADDRESS | DATA |
|---------|------|
| 0 | A' |
| 1 | B' |
| 2 | C' |
| 3 | D' |
| 4 | E' |
| 5 | F' |
| 6 | G' |
| 7 | H' |
| 8 | X |
| 9 | X |
| 10 | X |
| 11 | X |
| 12 | X |
| 13 | X |
| 14 | X |
| 15 | X |

Fig.-12

THREE DIMENSIONAL COMPUTER GRAPHIC SYMBOL GENERATOR

FIELD OF THE INVENTION

The present invention is directed generally to digital signal processing applications and, more particularly, to a three dimensional computer graphic symbol generator for use in a digital map system.

RELATED APPLICATIONS

The following applications and patents which are assigned to the assignee of the present invention are included herein by reference:

(1) U.S. Pat. No. 4,871,651 entitled DIGITAL MAP SYSTEM, filed May 11, 1988, issued Oct. 24, 1989;

(2) assignee's copending application, Ser. No. 07/514,724 filed Apr. 26, 1990 entitled POLYGON TILING ENGINE, now abandoned;

(3) U.S. Pat. No. 4,884,220 entitled GENERATOR WITH VARIABLE SCAN PATTERNS, filed Jun. 7, 1988, issued Nov. 28, 1989;

(4) assignee's copending application, Ser. No. 07/514,685 filed Apr. 26, 1990 entitled HIGH SPEED PROCESSOR FOR DIGITAL SIGNAL PROCESSING; and (5) assignee's application, Ser. No. 07/514,598 filed Apr. 26, 1990 entitled METHOD AND APPARATUS FOR GENERATING A TEXTURE MAPPED PERSPECTIVE VIEW, now U.S. Pat. No. 5,179,638, issued Jan. 12, 1993.

BACKGROUND OF THE INVENTION

Advanced digital map computer systems and, in particular, digital map computer systems capable of displaying a texture mapped perspective view require a capability for generating three dimensional symbology. The data structure of the three dimensional symbology must be compatible with digital terrain transformation pipeline processing techniques. Known symbol generators are two-dimensional in nature and do not position the symbology in three dimensional world coordinate space. Also using known techniques, two dimensional graphic symbology can be overlaid onto a digital map display but not positioned in depth.

The present invention provides a method and apparatus for translating a generic three dimensional library position of symbolic icons into the three dimensional world coordinate system of the digital terrain as displayed on a digital map system. The polygon description of the symbol can then be transformed by the same perspective transformation circuitry utilized for the other polygons, including terrain polygons. The data structures of the stored library symbols may be tagged with attributes to vary the appearance of the rendered symbol. Each vertex of a polygon may have red, green and blue (RGB) color attributes as well as an alpha-transparency factor, or texture mapping address. These attributes allow for varying the individual polygon facets which comprise a total icon. The three dimensional rendering may be placed any where in world space resulting in proper perspective viewing.

SUMMARY OF THE INVENTION

The invention provides an apparatus for generating three dimensional graphic symbols. Each symbol is comprised of a plurality of polygons referenced to a data point in, for example, a Cartesian coordinate system having X, Y and Z axes. A means for storing a vertex list is included. The vertex list characterizes each symbol and includes a starting address and a plurality of vertices, wherein each vertex is comprised of X, Y, and Z offsets from the data point. Each vertex has a surface normal assigned to it. Connected to the vertex storing means is a means for assigning an icon ID reference numeral to each symbol. A means for mapping Starting address is further connected to an output of the assigning means. The mapping means uses the icon ID reference numeral to point to each symbol's starting address. Means for transforming the vertex list into a different coordinate system is arranged to receive the vertex list from the vertex storing means. Means for tiling each symbol is arranged to receive the transformed vertex list from the transforming means.

DESCRIPTION OF THE PREFERRED EMBODIMENT

Figure 1:
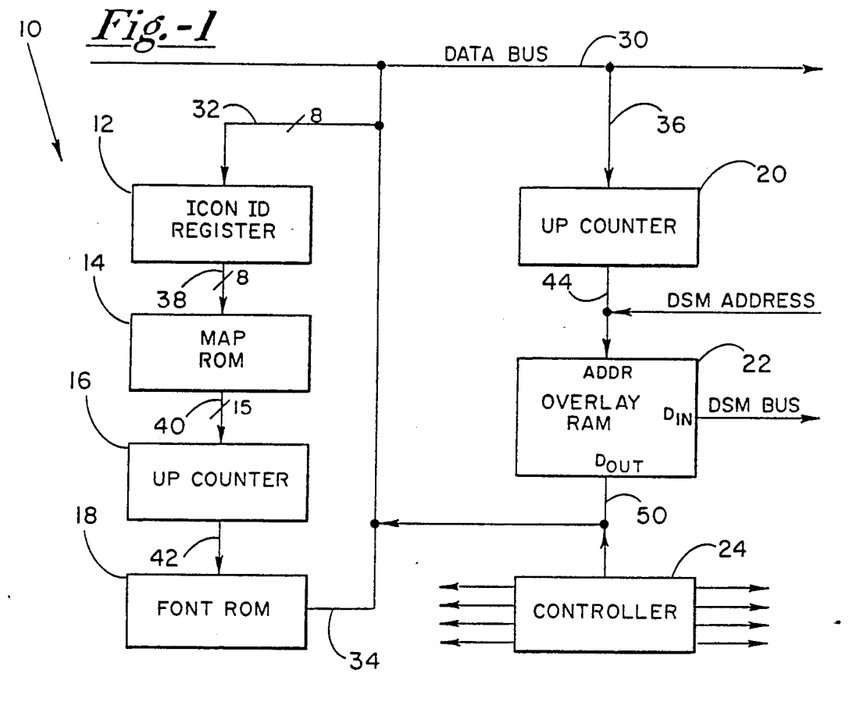
FIG. 1 shows a block diagram of a three dimensional symbol generator as employed in one example of the invention.

Referring now to FIG. 1, a block diagram of a symbol generator as employed in one embodiment of the invention is shown. The symbol generator 10 comprises an ICON ID register 12, a MAP ROM 14, a first up counter 16, a FONT ROM 18, a second up counter 20, an OVERLAY RAM 22 and a CONTROLLER 24. The registers, read-only memories (ROM), up counters and random access memory (RAM) 22 may be comprised of commercially available digital components. The CONTROLLER 24 controls the timing, data flow and other control parameters for operating the other components in a manner well known in the art. Data bus 30 is connected to ICON ID register 12 through bus 32, to FONT ROM 18 through bus 34 and to the second up counter 20 through bus branch 36. MAP ROM 14 receives ICON ID data on conduit 38 which, in this example, is an 8-bit conduit. Up counter 16 receives, in this example, 15 bits of data from MAP ROM 14 on conduit 40. Front ROM 18 receive data from up counter 16 via conduit 42. The second up counter 20 is connected by conduit 44 to the address input port, ADDR, of OVERLAY RAM 22. The data output of OVERLAY RAM 22, $D_{OUT}$ is connected to bus branch 34. Address information is received onto conduit 44 from the line labeled DSM ADDR which carries addresses from the DSM processor. One example of a DSM processor is explained in detail in the aforereferenced patent entitled DIGITAL MAP SYSTEM. Symbol data is received from the data import, $D_{IN}$ of the overlay RAM from the DSM BUS. Data is read out of the RAM onto lines 50.

Figure 2:
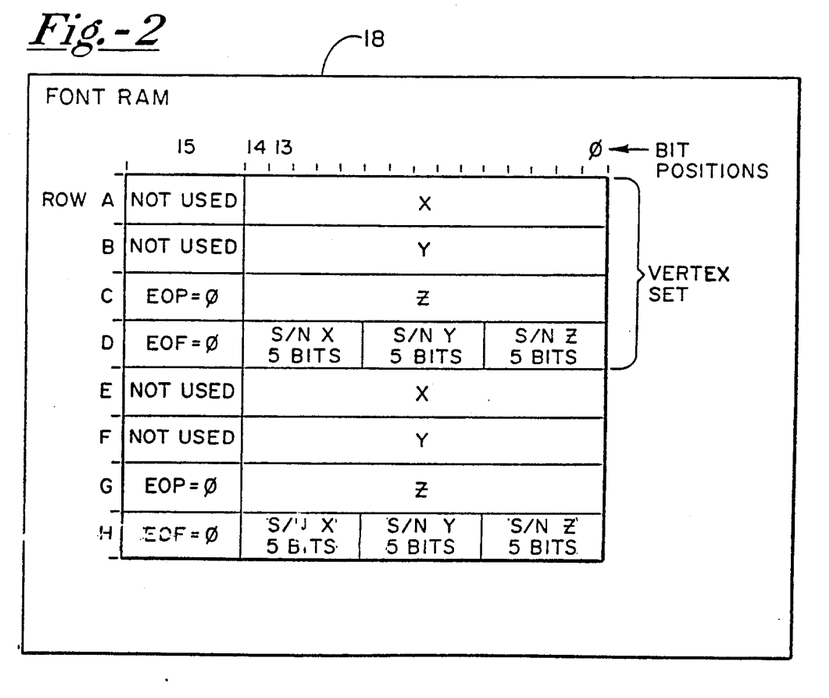
FIG. 2 illustrates a technique for storing fonts in a digital memory device in accordance with the invention.

Referring now to FIG. 2, a technique for storing fonts in a digital memory device in accordance with the invention is illustrated. For ease in describing the invention and for the purpose of illustrating the invention, several examples will be used throughout to illustrate the principles of the invention. However it will be understood by those skilled in the art that these are introduced solely for the purpose of illustration and not by way of limitation of the invention. In the example shown in FIG. 2, it is assumed that a model definition is relative to North and East directions and a height coordinate system. These coordinates and directions may advantageously be made to correspond to a Cartesian system having X, Y and Z coordinates respectively. Each row shown in FIG. 2, marked A-H in this example, represents a 16 bit word. In row A, the first bit is not used and the twos complement for the X coordinate is allocated 15 bits. Similarly, row B is allocated to the Y coordinate of the A vertex and is also stored in twos complement form as is the Z coordinate in row C. Row C also includes an end-of-polygon bit in the most significant bit. Row D comprises one bit for the end-of-font marker, EOF, and three surface normal vectors, S/N, comprising five bits each including S/N X, S/N Y, and S/N Z. Together rows A-D and E-F each make up a vertex set. That is, they completely describe one vertex in the stored ICON or symbol. Each vertex is composed of X, Y and Z offsets from a "datum" point of the ICON. Each vertex has a surface normal vector, in this example three 5 bit values, assigned to it. Each font character will be assigned an ICON ID reference numeral in the range of 0-255. The ICON ID will be stored in the ICON ID register 12 and address the MAP ROM.

Through the ICON ID register 12, for example, the ICON ID reference numeral assigned to each ICON addresses the MAP ROM 14. The MAP ROM, in turn, points to the starting address in the FONT ROM 18 of the vertex list for the ICON being generated. In on example of the invention, the ICON will be composed of 1 to N planar polygons with the connectivity of the vertices implied by the ordering of the vertices within the list. In this case, "N" represents any integer number greater than 1. The last vertex of a polygon is denoted by a "1" in the most significant bit of the Z parameter of the vertex. That is, EOP is set to "1". The last vertex of the last polygon of an ICON has the most significant bit set in the surface parameter, S/N, to indicate that the final vertex for the ICON being processed has been reached. In this example, EOF is set equal to "1".

Figure 3:
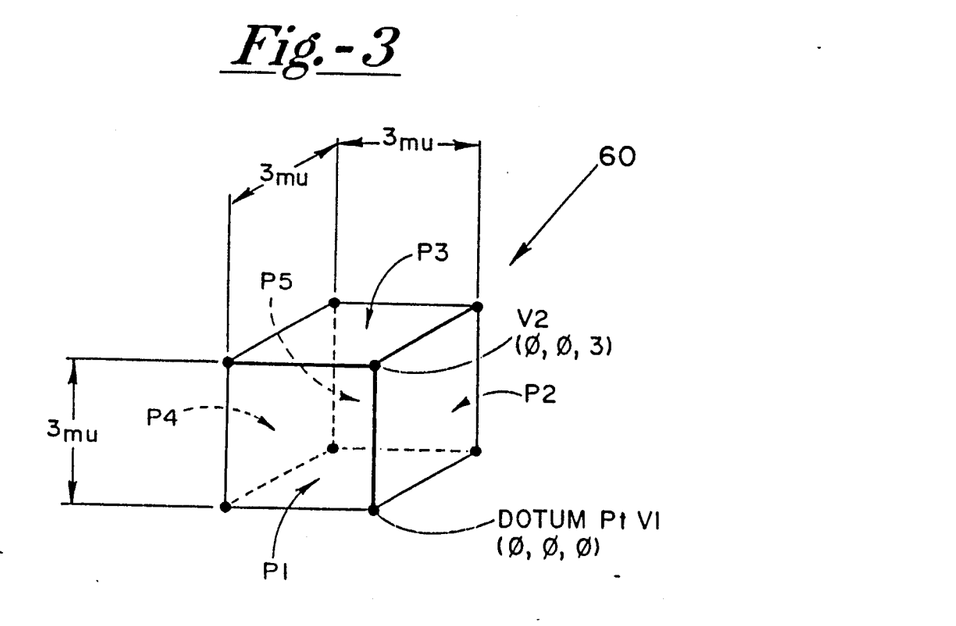
FIG. 3 illustrates one example of a symbol modeled by the method of the invention.
Figure 3A:
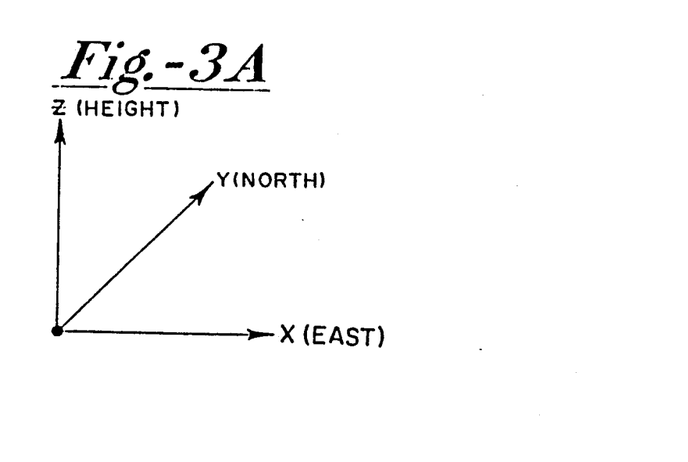
FIG. 3A illustrates one example of a frame of reference as used by the invention.

Now referring to FIG. 3, an example of a three dimensional ICON of the type generated by the method and apparatus of the invention is shown as cube 60. For the purposes of digital display, cube 60 is comprised of polygons P1, P2, P3, P4 and P5. The sixth face is left open. Each of the five polygons has four vertices. The cube is referenced to the coordinate system as shown in FIG. 3A having X, Y and Z coordinates corresponding to East, North and Height directions. A datum point V1 is selected to have coordinates (0,0,0). Therefore, in this example a second point designated V2 has coordinates (0,0,3) if the polygon is selected to have sides which is of an arbitrary size of 3 model units (mu).

Figure 4:
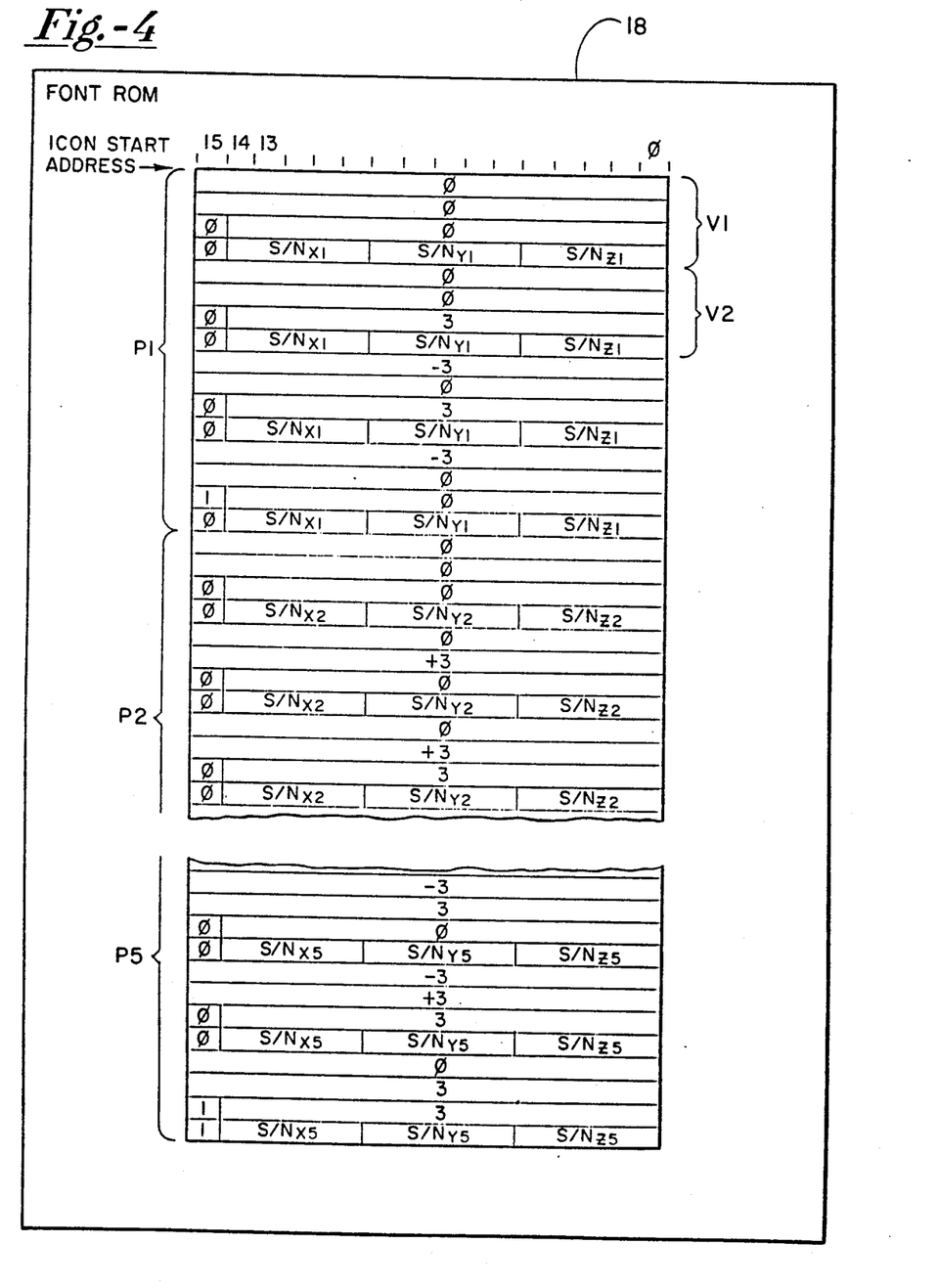
FIG. 4 illustrates an example of a vertex list as processed using one aspect of the invention.

Referring now to FIG. 4, the ICON 60 is shown as stored in the FONT ROM. The ICON is stored in a series of vertex sets V1, V2, etc. and is grouped by polygon number P1, P2 . . . P5. As explained above, the first three rows of each vertex set include the X, Y and Z coordinates and the 4th row contains the surface normals $S/N_{x1}$, $S/N_{y1}$ and $S/N_{z1}$. The block is given an ICON ID register number which causes the MAP ROM 14 to point to the ICON start address in FONT ROM 18 as indicated in polygon 1, vertex V1.

Figure 5:
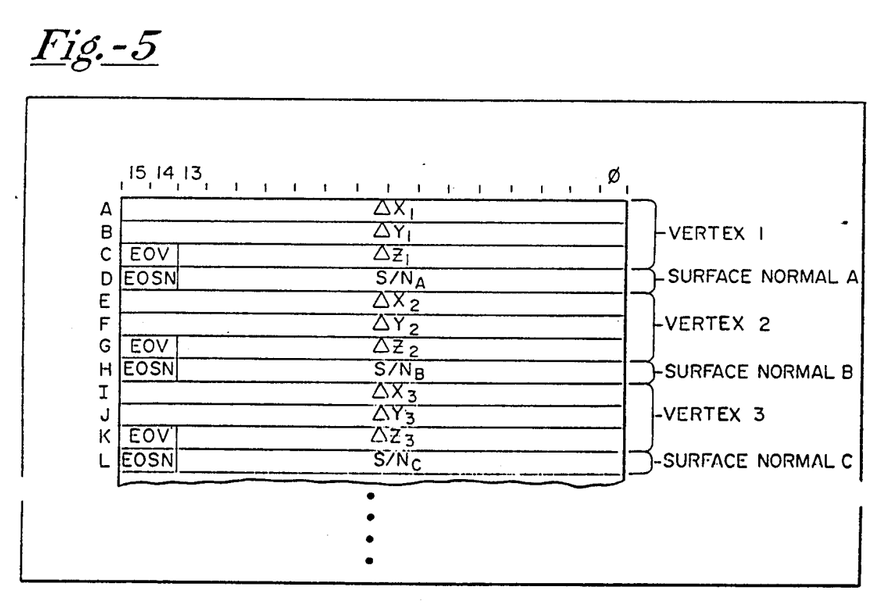
FIGS. 5 and 6 illustrate examples of vertex and surface normal lists as employed in an alternative aspect of the invention.

Study into the types of three dimensional symbology models needed for a digital map system indicate that two classes of models are needed. The first class, such as threat domes, require an individual surface normal vector assigned to each vertex residing in the model data base. This facilitates the use of GOURAUD shading on curved surface representations. The second class of three dimensional symbology models requires only that a surface normal be assigned to each polygon, wherein a single polygon may consist of many vertices such as is the case in FIG. 3, illustrating a cube 60. As can be seen from the above example, assigning a surface normal to a single polygon is required for flat surfaces such as the faces of cubes and pyramids. Implementing a surface normal for each polygon can be accomplished quite easily by modifying the scheme described above with reference to FIGS. 2, 3 and 4 by modeling each ICON in two separate files. The first file is called the Vertex and Surface Normal List, or VSN List, and the second file is called the Connectivity Map. This alternate embodiment of the invention is illustrated in FIG. 5. Here the surface normals for each vertex as shown above with reference to FIG. 4 have been replaced by a single surface normal for each face of each polygon in the symbol. The primary difference between the two embodiments is that an individual surface normal is not assigned to each vertex. Instead, the relationship between surface normals and vertices is assigned by the Connectivity Map.

Referring to FIG. 5, note that S/NA does not necessarily belong to vertex 1. It could belong to an entire polygon comprising many model vertices. As used in this example, one constraint is that the surface normals in the VSN list must appear in the order in which they will be used by the Connectivity Map. Other changes in the scheme include discarding the End Of Polygon bit, EOP, embedded in the most significant bit of the Z parameter as shown in rows C, G and K. In this aspect of the invention, the End Of Polygon bit is replaced with an End of Vertices indicator bit, EOV. The most significant bit of each surface normal parameter indicates whether or not the matching surface normal is the last one included in the VSN list. This bit is denoted by the End Of Surface Normal, EOSN. When the EOV or EOSN indicator bit is encountered in the VSN list, it signifies that the data type corresponding to that bit (i.e. vertex or surface normal) is complete for the ICON being processed. The remaining data type appears in consecutive locations in the VSN list until it is completely read. When both the EOSN and EOV have been encountered, the information for the ICONs VSN list has been read completely. A new ICON can then be processed.

In one example embodiment of the invention, the VSN list contains the relative vertex positions of the generic library icons. In addition, it contains a 16 bit surface normal, a one bit end of polygon flag, and a one bit end of symbol flag. The table is 32K×16 bits. A maximum of 512 vertices may be associated with any given icon. The Connectivity Map contains the connectivity information of the vertices of the symbol. A 64K by 12 bit table holds this information.

Figure 11:
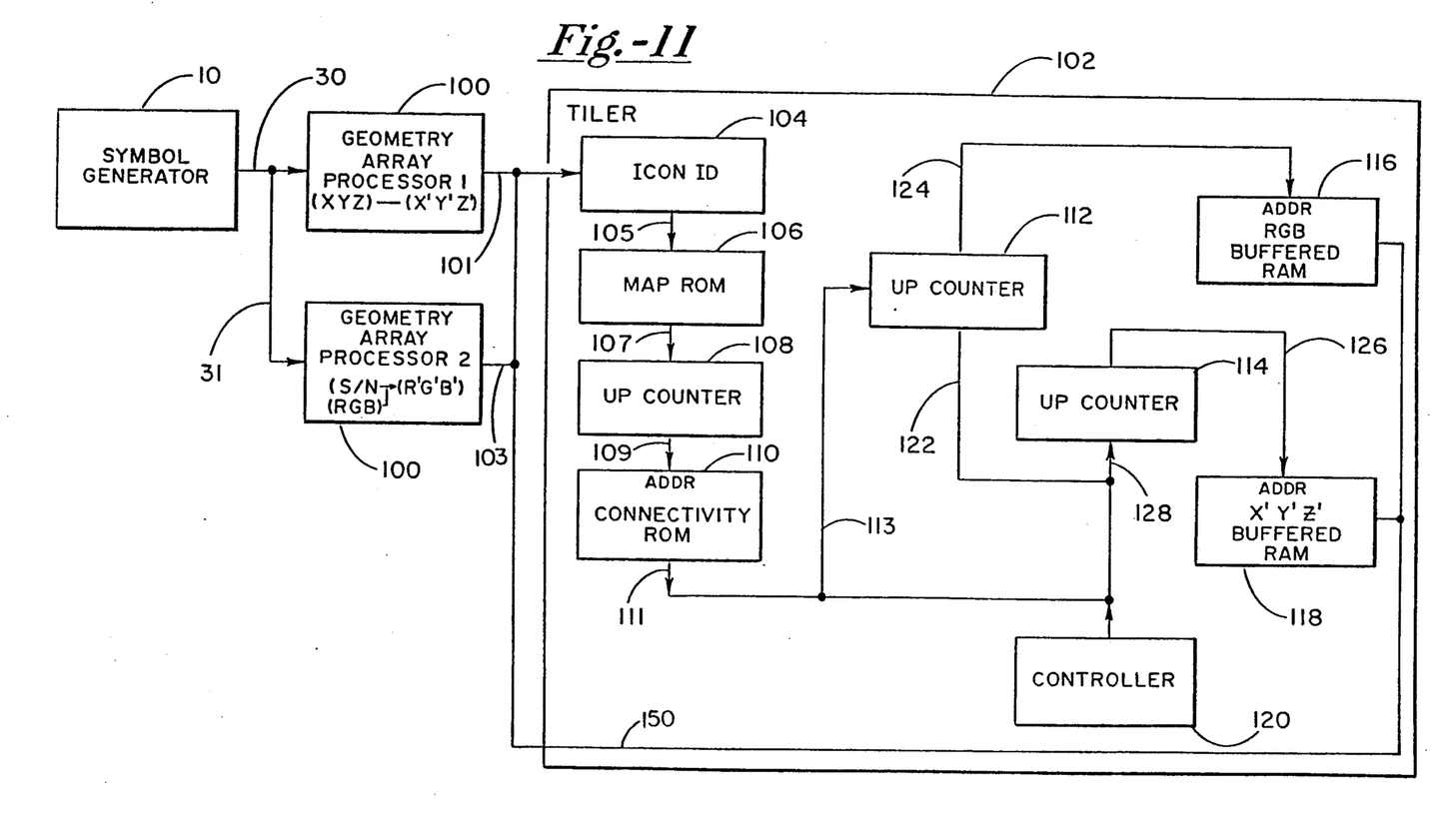
FIG. 11 is a block diagram which schematically illustrates the tiler as employed in a basic three dimensional symbol generating apparatus of the invention.

Referring now to FIG. 11, a block diagram which schematically illustrates a basic three dimensional symbol generation apparatus as employed by the invention is shown. The symbol generator apparatus comprises symbol generator 10, first and second geometry array processors 100, and tiler 102. The geometry array processors are preferably comprised of high speed numeric processor such as is described in the assignee's copending application for a HIGH SPEED PROCESSOR FOR DIGITAL SIGNAL PROCESSING, referenced hereinabove. The tiler comprises a second ICON ID register 104 which receives data from the first and second geometry array processor from lines 101 and 103 and is connected at an output by lines 105 to MAP ROM 106. MAP ROM 106 is, in turn, connected to a third counter 108 by lines 107. The third up counter 108 is connected by lines 109 to a CONNECTIVITY ROM 110 which contains the connectivity list. The output of the CONNECTIVITY ROM is carried on line 111 and 113 to a fourth up counter 112. The output of up counter 112 is transmitted on line 124 to the address input of RAM 116 which contains the RGB or red, green, blue data for each vertex. The fifth up counter 114 is connected by line 128 to the output of connectivity ROM 110 through conductors 128. The output of up counter 114 is transmitted on lines 126 to the address input port of buffered RAM 118 which stores the perspective transformed X', Y', Z' coordinates.

In one embodiment of a three dimensional graphic symbol generator as used in the digital map system described in the aforereferenced copending application entitled METHOD AND APPARATUS FOR GENERATING A TEXTURE MAPPED PERSPECTIVE VIEW, the VSN list resides in the three dimensional symbol generator electronics. The Connectivity Map resides on a circuit board which also contains tiler electronics.

The two geometry array processors (GAPs) 100 run in parallel. The arrangement of the data in the VSN list allows a vertex to be fed to one GAP and a surface normal to the other. In this case, the surface normal information, together with the RGB information is sent to GAP 2 while the X, Y, Z coordinates are sent to GAP 1. Both sets of data are then processed in parallel, with the results of the two operations getting loaded into the tiler simultaneously. Processing is as described in assignee's copending applications, entitled POLYGON TILING ENGINE and METHOD AND APPARATUS FOR GENERATING A TEXTURE MAPPED PERSPECTIVE VIEW, as referenced above. Note that the ICON ID reference numeral must be passed through the GAPs to the tiler for the Connectivity Map addressing.

Figure 6:
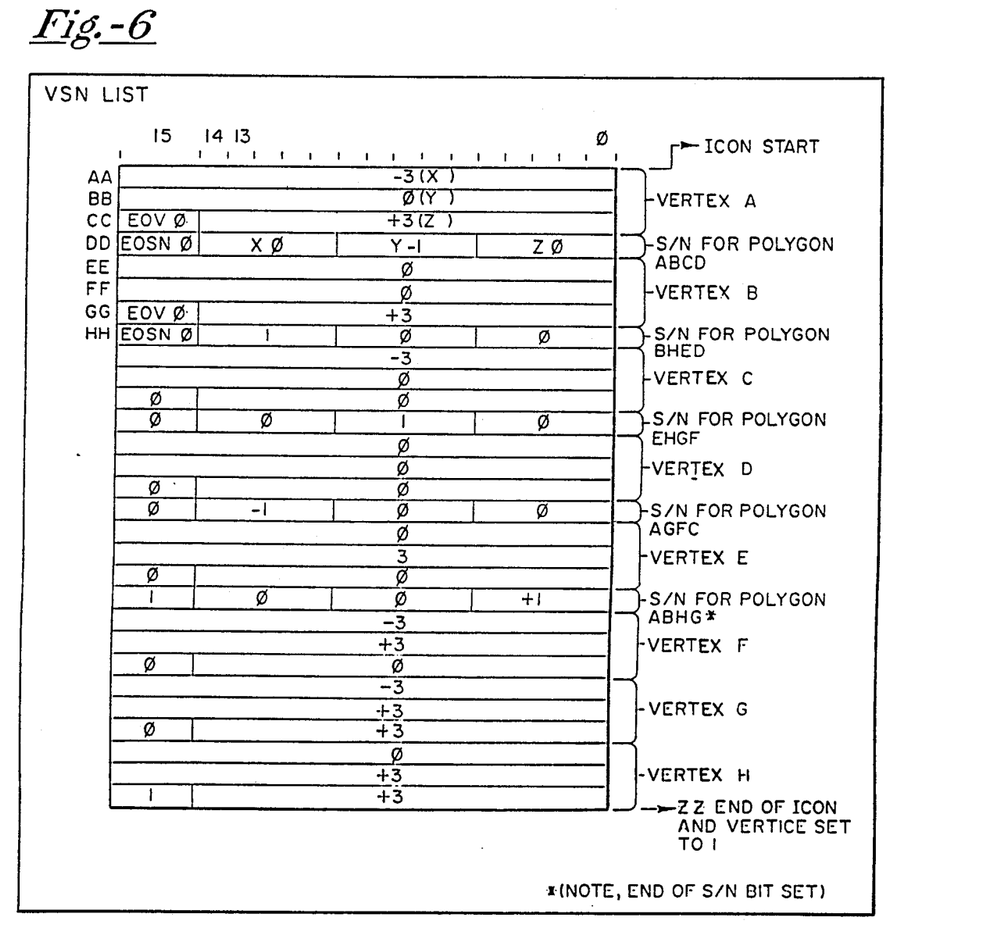
Figure 7:
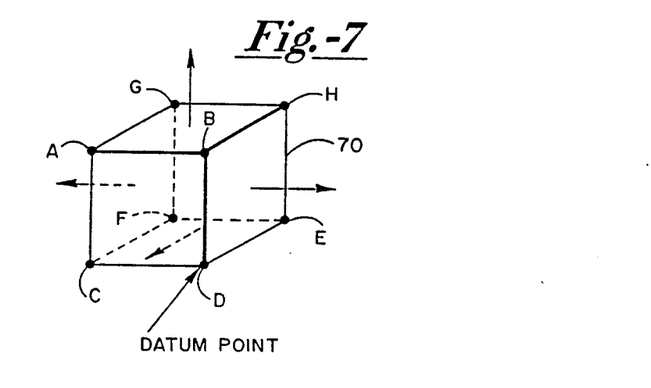
FIG. 7 illustrates an example of a cube symbol as modeled by one aspect of the invention.

Referring now to FIGS. 6 and 7, an example of a font employing the above-described alternative aspects of the invention is shown. FIG. 7 shows a cube 70 having vertices A-H with a datum point at vertex D. The ICON is a 3×3×3 cube 70 having an open bottom and five faces. In the VSN list, the ICON starts at row AA and ends at row ZZ. Rows AA, BB and CC contain the coordinate information for vertex A which, in this case, is (−3,0,+3). The surface normal for X, Y and Z for polygon ABCD is (0,−1,0) as shown in row DD. The End of Vertex, EOV, column occupies the MSB or bit 15 in row CC and is set to "0" to indicate that more vertices are in the list. The EOSN bit occupies bit 15 in row DD and is set to "0" for all vertices except vertex H in row ZZ where it is set to "1" to mark the end of surface normal list. Similarly, vertex B is described by rows EE, FF and GG and the surface normal for polygon BHED is stored in row HH.

Figure 8:
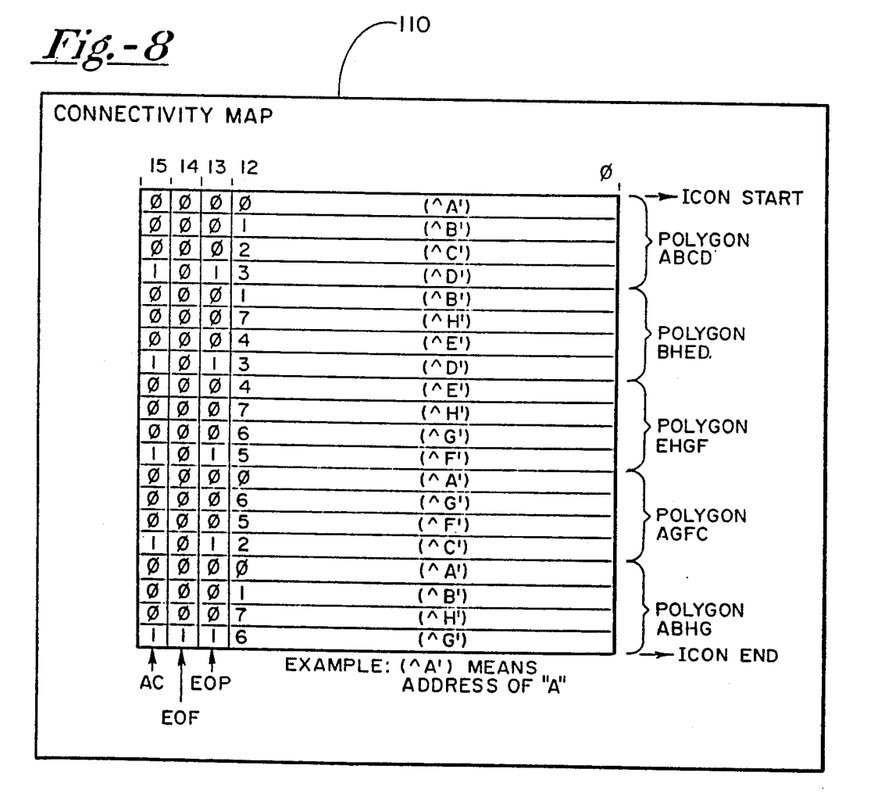
FIG. 8 illustrates a Connectivity Map as employed by an alternative aspect of the invention.

The X', Y', Z' RAM 118 and the RGB BUFFERED RAM 116 are coupled to receive data from GAP1 and GAP2 by a data bus 150. As the symbol is processed by GAP 1, the transformed XYZ vertex data is loaded in order starting from address 0 into the X', Y', Z' RAM 118. The S/N data in the VSN list is transformed and then used to produce a sun angle shaded Red, Green, Blue output from GAP 2. This data is loaded into the RGB RAM 116 in order starting at address 0. The ICON ID is passed through GAP 1 and is used to select the correct Connectivity Map within the CONNECTIVITY MAP ROM 110. The Connectivity Map (see FIG. 8) is then sequentially addressed until the End Of Font (EOF) bit is encountered. The 12 least significant bits of data in the Connectivity Map are used to address the X', Y', Z' RAM 118 directly. The RGB value assigned to each X', Y', Z' read out of the X', Y', Z' RAM depends on the value of the pointer in the RGB RAM. Initially this pointer is set to "0" for each symbol. Each time an advance color (AC) bit is encountered in the connectivity data, the pointer is advanced by 1 when the current access is finished. By using this pointer, it is possible to assign unique RGB values to vertices or polygons by coding the connectivity list differently. Note, however, that the coding of the VSN list determines the way that the Connectivity Map is coded. If each vertex within a symbol is to be uniquely colored, each vertex within the VSN list must have a corresponding S/N. That number of vertices equals the number of surface normal vectors. Polygon boundaries within a symbol are signified by the End Of Polygon (EOP) bit coded into the Connectivity Map data. One example of the coding of the CONNECTIVITY MAP ROM 110 is shown in FIG. 8. The AC, EOF and EOP bits are clearly identified.

Figure 9:
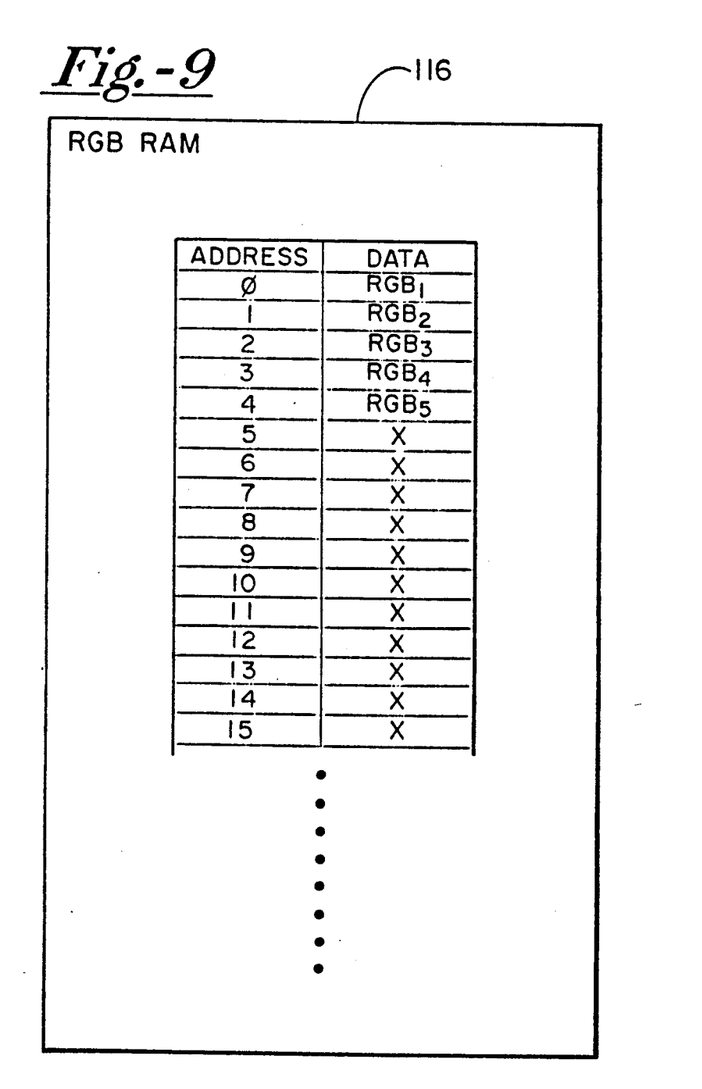
FIG. 9 schematically illustrates the data storing scheme for an RGB RAM as employed by one aspect of the invention.
Figure 10:
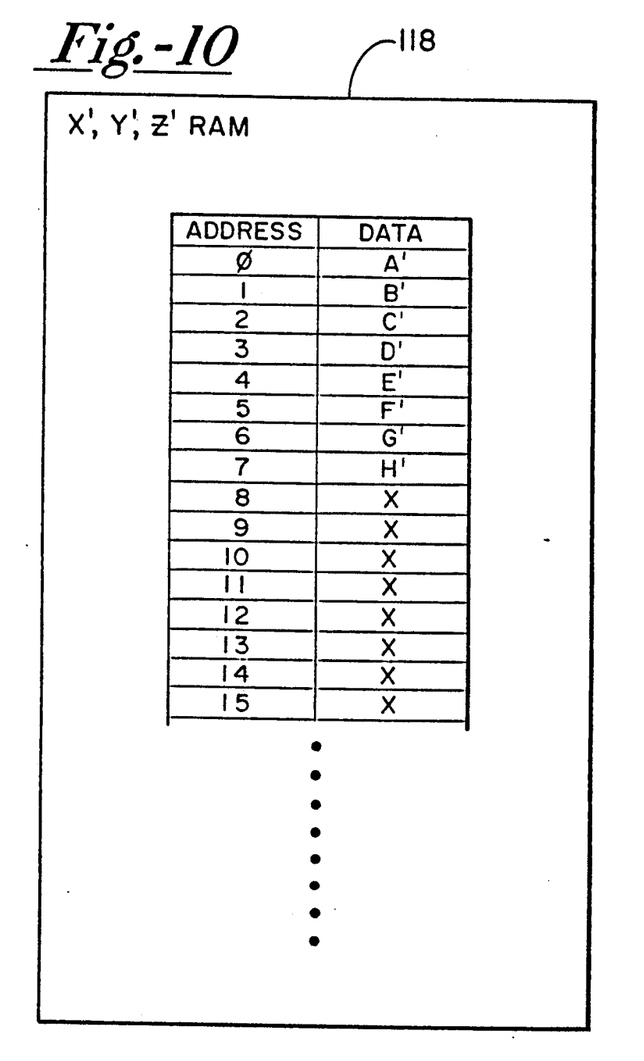
FIG. 10 schematically illustrates the data storing scheme for transformed coordinate data in the X'Y'Z' RAM as employed by one aspect of the invention.

FIG. 9 illustrates the data storage scheme in RGB RAM 116. Each RGB value has its own value which is assigned to each X', Y', Z' readout of the X', Y', Z' RAM and depends upon the value of the pointer into the RGB RAM. FIG. 10 shows the data storage scheme in the X',Y',Z' RAM 118 wherein the transformed vertices are stored, namely A', B', C' through H' in this example.

Figure 12:
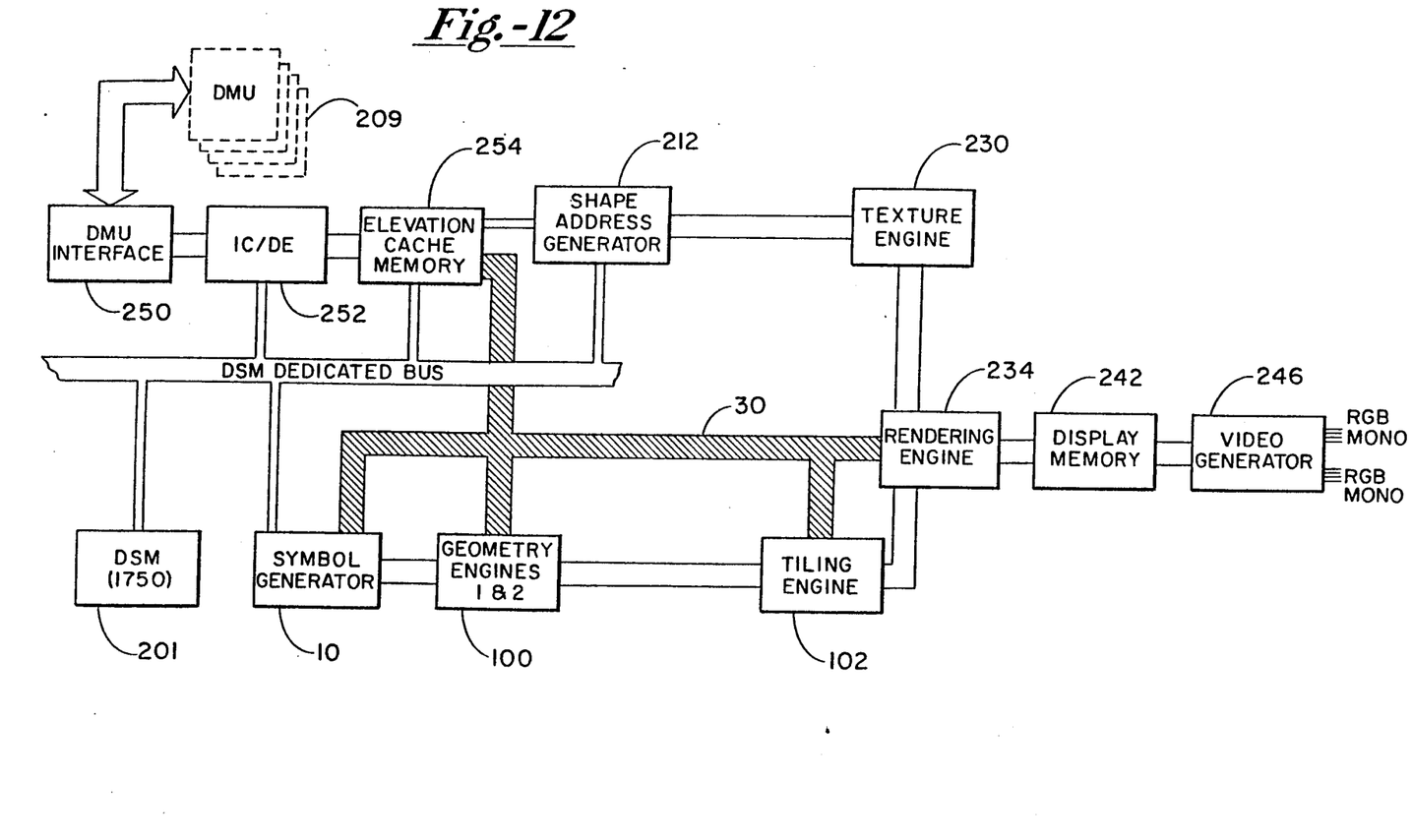
FIG. 12 is a partial block diagram of a digital map system employing the three dimensional symbol generator of the invention.

Referring now to FIG. 12, a partial block diagram of a digital map system such as is described in the assignee's copending application entitled "METHOD AND APPARATUS FOR GENERATING A TEXTURE MAP PERSPECTIVE VIEW", as referenced above, is shown in order to illustrate the placement of the symbol generator 10 in such a system. The system comprises a digital memory unit (DMU) 209, a DMU interface 250, an IC/DE 252, an elevation cache memory 254, a shaped address generator 212, DSM controller 201, texture engine 230, rendering engine 234, display memory 242, video generator 246, symbol generator 10, geometry engines 100 and tiling engine 102. In the system illustrated in FIG. 12, the symbol generator 10 performs the following tasks:

1. It places a model to world transformation coefficients in the GAPs.
2. It operates in cooperation with the geometry engines to multiply a world to screen transformation matrix by the model to world transformation matrix to form a model to screen transformation matrix. This matrix is stored over the model to world transformation matrix.
3. It operates in cooperation with the geometry engines to apply the model to screen transformation matrix to each point of the symbol from the vertex list to transform the generic icon to the particular symbol.
4. It processes the connectivity list in the tiling engine, forms the screen polygons and passes them to the rendering engine.

In one aspect of the invention, the symbol generator data base consists of a vertex list library and 64K bytes of OVERLAY RAM and a connectivity list. Up to 18K bytes of DFAD (i.e., 2K bytes display list from cache shadow RAM x 9 buffer segments) are loaded into the OVERLAY RAM for cultural feature processing. The rest of the memory holds the threat/intelligence file and the mission planning file for the entire gaming area. The OVERLAY RAM is loaded over the control bus from the DSM processor with the threat and mission planning files. The Shape Address Generator (SHAG) 212 loads the DFAD files. The symbol libraries are updated via the configuration bus.

A pathway in the sky format may be implemented in this system. It consists of either a wire frame tunnel or an elevated roadbed for flight path purposes. The wire frame tunnel is a series of connected transparent rectangles generated by the tiling engine of which only the edges are visible (wire mesh). Alternatively, the polygons may be precomputed in world coordinates and stored in a mission planning file. The roadbed is similarly comprised of polygons generated by the tiler along a designated pathway. In either case, the geometry engine must transform these polygons from object space (i.e. the world coordinate system) to screen space. The transformed vertices ar then passed to the rendering engine. The parameters (e.g., height, width, frequency) of the tunnel and roadbed polygons are programmable.

Another example of a generated symbol is a waypoint flag. Waypoint flags are markers consisting of a transparent or opaque triangle on a vertical staff rendered in perspective. The waypoint flag icon is generated by the symbol generator as a macro from a mission planning file. Alternatively, they may be precomputed as polygons and stored. The geometry engine receives the vertices from the symbol generator and performs the perspective transformation on them. The geometry engine passes the rendering engine the polygons of the flag staff and the scaled font call of the alphanumeric symbol. Plan view format consists of a circle with a number inside and is not passed through the geometry engine.

DFAD data processing consists of a generalized polygon renderer which maps a possible 32K points down to 256 polygons or less for a given buffer segment. These polygons are then passed to the rendering engine. This approach may redundantly render terrain and DFAD for the same pixels but easily accommodates declutter of individual features. Another approach is to rasterize the DFAD and use a texture warp function to color the terrain. This would not permit declutter of individual features but only classes (by color). Terrain color show-through in sparse overlay areas would be handled by a transparent color code (screen door effect). No verticality is achieved. One useful method for processing of terrain data is described in assignee's copending application entitled POLYGON TILING ENGINE which is referenced above.

In one embodiment of a digital map system employing the invention, there are 298 categories of aerial, linear, and point features. Linear features must be expanded to a double line to prevent interlace strobing. A point feature contains a length, width, and height which can be used by the symbol generator for expansion. A typical lake contains 900 vertices and produces 10 to 20 active edges for rendering at any given scan line. The number of vertices is limited to 512. The display list is 64K bytes for a 1:250K buffer segment. Any given feature could have 32K vertices.

Up to 2K bytes of display list per buffer segment DTED is accommodated for DFAD. The DSM 201 can tag the classes or individual features for clutter/declutter by toggling bits in the OVERLAY RAM of the SHAG.

The symbol generator also processes macros and graphic primitives which are passed to the rendering engine. These primitives include lines, arcs, alphanumerics, and two dimensional symbology. The rendering engine draws these primitives and outputs pixels which are anti-aliased. The GAPS 100 transform these polygons and pass them to the rendering engine 234. A complete $4 \times 4$ Euler transformation is performed. Typical macros include compass rose and range scale symbols. Given a macro command, the symbol generator produces the primitive graphics calls to the rendering engine. This mode operates in plan view only and implements two dimensional symbols. Those skilled in the art will appreciate that the invention is not limited to specific fonts.

Three dimensional symbology presents the problem of clipping to the view volume. A gross clip is handled by the DSM in the cache memory at scan out time. The base of a threat dome, for example, may lie outside the orthographic projection of the view volume onto cache, yet a part of its dome may end up visible on the screen. The classical implementation performs the functions of tiling, transforming, clipping to the view volume (which generates new polygons), and then rendering. A gross clip boundary is implemented in cache memory around the view volume projection to guarantee inclusion of the entire symbol. The anomaly under animation to be avoided is that of having symbology sporadically appear and disappear in and out of the frame at the frame boundaries. A fine clip to the screen is performed downstream by the rendering engine. There is a 4K boundary around the screen which is rendered. Outside of this boundary, the symbol will not be rendered. This causes extra rendering which is clipped away.

Threat domes are represented graphically in one embodiment by an inverted conic volume. A threat/intelligence file contains the location and scaling factors for the generic model to be transformed to the specific threats. The tiling engine contains the connectivity information between the vertices and generates the planar polygons. The threat polygons are passed to the rendering engine with various viewing parameters such as mesh, opaque, dot, transparent, and so forth.

Graticles represent latitude and longitude lines, UTM klicks, and so forth which are warped onto the map in perspective. The symbol generator produces these lines. A cursor symbol is flown around the screen, and is also generated by the symbol generator.

A generic threat symbol is modeled and stored in the three dimensional symbol generation library in the system illustrated. Parameters such as position, threat range, and angular threat view are passed to the symbol generator as a macro call (similar to a compass rose). The symbol generator creates a polygon list for each threat instance by using the parameters to modify the generic model and place it in the world coordinate system of the terrain data base. The polygons are transformed and rendered into screen space by the perspective view pipeline. These polygons form only the outside envelope of the threat cone.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus for generating three dimensional graphic symbols, the apparatus comprising:
   (a) a means for storing a vertex list which characterizes a plurality of symbols including a selected symbol to be generated, each symbol has a datum point, each symbol is comprised of a plurality of polygons, wherein each polygon is further comprised of a plurality of vertices within the vertex list and wherein each of the plurality of vertices is comprised of X, Y and Z offsets from the datum point, the vertex list includes a starting address for each symbol, and each symbol has a connectivity map;
   (b) a first means for registering an ICON ID reference numeral for the selected symbol;
   (c) a first memory means coupled to the first registering means for mapping the vertex list of the selected symbol by pointing to the starting address of the vertex list of the selected symbol in the vertex list storing means using the selected symbol's ICON ID reference numeral;
   (d) means for transforming the mapped vertex list into a screen coordinate system, the transforming means arranged to receive the mapped vertex list, beginning with the starting address pointed to by the first memory means, from the vertex list storing means, wherein the transforming means also receives the ICON ID of the selected symbol from the registering means; and
   (e) means for tiling the selected symbol wherein the tiling means is arranged to receive the transformed vertex list from the transforming means, wherein the tiling means further comprises:
      i. second means coupled to the transforming means for registering the ICON ID reference numeral, the second registering means having an output for transmitting the ICON ID reference numeral,
      ii. a second memory means for mapping to the starting address of the selected symbol's connectivity map using the ICON ID reference numeral to point to the symbol's connectivity map starting address, and wherein the second memory means is arranged to receive the ICON ID reference numeral from the second registering means,
      iii. a first address setup means for providing connectivity map addresses for the selected symbol wherein the first address setup means receives the selected symbol's connectivity map starting address from the second memory means, and
      iv. a third memory means coupled to the first address setup means for retrieving the connectivity map for the selected symbol in response to receiving the selected symbol's connectivity map addresses including the selected symbol's connectivity map starting address from the first address setup means.

2. The apparatus of claim 1 wherein the list comprises a plurality of vertex sets wherein each vertex set is comprised of a data word and the data word is further comprised of coordinate and surface normal data words.

3. The apparatus of claim 1 wherein each polygon has a surface normal assigned to it in the vertex list.

4. The apparatus of claim 1 wherein each vertex has a surface normal assigned to it in the vertex list.

5. A method for generating three dimensional graphic symbols in a digital processing system including a means for storing a vertex list, a first means for registering, a first memory means, a means for transforming and a means for tiling, the method comprising the steps of:
   (a) operating the means for storing a vertex list to store a vertex list which characterizes a plurality of symbols including a selected symbol to be generated, each symbol having a datum point, wherein each symbol is comprised of a plurality of polygons, wherein each polygon is further comprised of a plurality of vertices within the vertex list and wherein each of the plurality of vertices is comprised of X, Y and Z offsets from the datum point, wherein the vertex list includes a starting address for each symbol, and wherein each symbol has a connectivity map;
   (b) operating the first means for registering to register an ICON ID reference numeral for the symbol to be generated;
   (c) operating the first memory means to map to the vertex list of the selected symbol by pointing to the starting address of the selected symbol in the vertex list storing means using the ICON ID reference numeral;
   (d) operating the means for transforming to receive the mapped vertex list into a screen coordinate system, and further operating the transforming means to also receive the ICON ID of the selected signal; and
   (e) operating the means for tiling to tile the selected symbol wherein the tiling means is arranged to receive the transformed vertex list from the transforming means, and wherein operating the tiling means further comprises the steps of:
      i. receiving the ICON ID reference numeral of the selected symbol from the transforming means, ii. operating a second memory means to map to the connectivity map of the selected symbol using the received ICON ID reference numeral to point to the selected symbol's connectivity map starting address, iii. generating the selected symbol's connectivity map addresses wherein the selected symbol's connectivity map starting address is received from the second memory means and subsequent addresses are generated in sequence, and iv. retrieving the connectivity map for the selected symbol in response to receiving the selected symbol's connectivity map addresses including the starting address.

6. The method of claim 5 wherein the vertex list comprises a plurality of vertex sets wherein each vertex set is comprised of a data word and the data word is further comprised of coordinate and surface normal data words.

* * * * *